US007058367B1

(12) United States Patent
Luo et al.

(10) Patent No.: US 7,058,367 B1
(45) Date of Patent: Jun. 6, 2006

(54) RATE-ADAPTIVE METHODS FOR COMMUNICATING OVER MULTIPLE INPUT/MULTIPLE OUTPUT WIRELESS SYSTEMS

(75) Inventors: Hui Luo, Marlboro, NJ (US); Nelson Ray Sollenberger, Farmingdale, NJ (US); Jack Harriman Winters, Middletown, NJ (US)

(73) Assignee: AT&T Corp., New York, NY (US)

( * ) Notice: Subject to any disclaimer, the term of this patent is extended or adjusted under 35 U.S.C. 154(b) by 554 days.

(21) Appl. No.: 10/356,439

(22) Filed: Jan. 31, 2003

(51) Int. Cl.
*H04B 7/02* (2006.01)

(52) U.S. Cl. .................. 455/101; 455/562.1; 455/524; 375/267

(58) Field of Classification Search ................ 455/101, 455/562.1, 561, 560; 375/267, 260, 346
See application file for complete search history.

(56) References Cited

U.S. PATENT DOCUMENTS

| | | | |
|---|---|---|---|
| 6,380,910 B1 | 4/2002 | Moustakas et al. | |
| 6,396,885 B1 | 5/2002 | Ding et al. | |
| 6,426,723 B1 | 7/2002 | Smith et al. | |
| 6,473,467 B1* | 10/2002 | Wallace et al. | ............. 375/267 |
| 6,493,331 B1 | 12/2002 | Walton et al. | |
| 6,493,399 B1 | 12/2002 | Xia et al. | |
| 6,754,475 B1* | 6/2004 | Harrison et al. | ......... 455/115.1 |
| 6,771,706 B1* | 8/2004 | Ling et al. | ................... 375/267 |
| 6,785,341 B1* | 8/2004 | Walton et al. | .............. 375/267 |
| 6,927,728 B1* | 8/2005 | Vook et al. | ................. 342/377 |
| 6,940,917 B1* | 9/2005 | Menon et al. | .............. 375/267 |

OTHER PUBLICATIONS

Web ProForum Tutorial: Smart Antenna Systems, printed from http://www.iec.org/tutorials/smart_ant/index.html on Dec. 14, 2000, 32 pages.
A Multimode Adaptive Beamformer, printed from http://www.appsig.com/papers/1813a/813a_2.html on Dec. 14, 2000, 3 pages.
Wecome To The HDTV Newsletter printed from http://webstar.com/hdtv/cofdmscher.html on Dec. 14, 2000, 7 pages.

* cited by examiner

*Primary Examiner*—Tilahan Gesesse

(57) ABSTRACT

A rate-adaptive method of communicating over a multipath wireless communication system uses multiple links such that each end of a link uses multiple transmit and receive antennas. A number of independent streams that are to be transmitted for each link is determined based on an overall system performance measure. In addition, the system may also jointly determine the best modulation, coding, power control, and frequency assignment for each link, based on an overall system performance measure. In OFDM systems, the number of independent streams, as well as the modulation, coding, and power control, may be determined on a tone-by-tone basis based on an overall system performance measure.

21 Claims, 7 Drawing Sheets

RATE-ADAPTIVE METHODS FOR COMMUNICATING OVER MULTIPLE INPUT/MULTIPLE OUTPUT WIRELESS SYSTEMS

BACKGROUND OF THE INVENTION

1. Field of the Invention

The present invention relates to cellular wireless communications and, in particular, to rate-adaptive Multiple Input/Multiple Output (MIMO) communication techniques using multiple transmit and multiple receive antennas.

2. Background of the Related Art

There is an ever-increasing demand for high-speed wireless data services. The present invention increases the data rate of a high-speed wireless data service operating in a multipath environment. Increases in the data rate result in cost reductions as a result of the ability to provide the enhanced service (data rate) with the same bandwidth (spectrum) rather than having to consume additional bandwidth (spectrum).

BRIEF SUMMARY OF THE INVENTION

The present invention provides a rate-adaptive Multiple Input/Multiple Output (MIMO) communications system and technique for cellular wireless communications systems using multiple transmit and multiple receive antennas. It is assumed herein that in a cellular wireless network, each base station employs multiple antennas for transmitting and receiving, and so does every mobile station. The techniques presented here, however, can also be used in a mixed network, where both single-antenna base stations and/or mobiles exist with multiple-antenna base stations and mobiles. For the purpose of simplicity, the rate-adaptive MIMO communication technique of the present invention is mainly described herein in terms of a downlink, i.e., the situation in which a base station transmits signals to a mobile station. The same technique can be applied to an uplink, i.e., the situation in which a mobile station transmits signals to a base station. The cell to which the base station and the mobile station belong is referred to herein as the studied cell. The number of antennas on the base station and on the mobile station is M. The data transmitted between the base station and the mobile station are organized into frames. The time duration for a frame is called a time slot. In a time slot, a station, whether a base station or a mobile station, may simultaneously transmit multiple frames using multiple transmit antennas. The symbol sequence in a frame is also called a signal or a stream.

In a system with multiple (e.g., M) transmit and receive antennas, the capacity of a given link between a base station and mobile station is always maximized by transmitting using MIMO to transmit M signals between the base station and mobile. (This may not strictly be true for the throughput, though, if only a finite number of modulation/coding schemes can be used for each signal.) The overall system throughput/capacity, however, may not be maximized by transmitting M signals—fewer than M signals can give higher results. Therefore, the present invention uses an overall system measure, such as total throughput, in determining the number of signals used on a given link. Other performance measurements can also be used.

A first embodiment of the present invention is provided by a rate-adaptive method of communicating over a multipath wireless communication system, in which the wireless communication system has multiple links and each end of a link uses multiple transmit and receive antennas. The method includes a step of determining a number of independent streams that are to be transmitted for each link based on an overall system performance measure, such as an overall system throughput over all links, an Signal-to-Interference-and-Noise Ratio (SINR) for at least one link, a minimum mean-squared error for at least one link, a calculated data rate for at least one link, a minimum of a maximum delay for at least one link, and/or a maximum of a minimum data rate for each link. In this regard, the system measures performance of at least one link, determines an appropriate modulation for the link (based on an overall system performance measure), which includes an adaptive modulation, such as BPSK modulation or QPSK modulation, and can include adaptive forward error correction (FEC) coding. Additionally, the system can use a dynamic channel assignment technique that is based on an overall system throughput, a maximum delay and/or a minimum data rate. Further, the system can use adaptive power control over at least one link. Further still, the technique can be applied to Orthogonal Frequency Division Modulation (OFDM), where the MIMO can be adjusted on a tone-by-tone basis. Note that the number of MIMO signals is jointly determined with the modulation, coding, and power control, and on a tone-by-tone basis with OFDM.

A second embodiment of the present invention provides a rate-adaptive method of communicating over a wireless communication system that includes a first station having multiple transmit antennas and multiple receive antennas and a second station having multiple transmit antennas and multiple receive antennas. A signal is transmitted in a first frame from the first station to the second station using one of a single transmit antenna of the first station and multiple transmit antennas of the first station with transmission diversity. A second frame is received from the second station at the first station. The second frame includes an indication that at least one additional signal should be transmitted in the third frame. According to the invention, the indication received in the second frame is based on an overall system performance measure, such as an overall system throughput, a minimum of a maximum delay for all links in the wireless communication system, a maximum of a minimum data rate for all links in the wireless communication system, an SINR associated with the first frame, and a minimum mean-square error associated with the first frame. A predetermined number of signals is transmitted in the third frame from the first station to the second station when the second frame includes the automatic retransmission request instruction. The predetermined number of signals is transmitted using a corresponding predetermined number of transmit antennas of the first station and is based on the indication received from the second station that at least one additional signal should be transmitted in the third frame. A fourth frame is received from the second station at the first station. The fourth frame includes an indication of a number of signals that should be transmitted from the first station to the second station in a fifth frame in a control sequence of the fourth frame. The fourth frame can include an indication of a modulation method that is to be used for each signal transmitted in the fifth frame. Alternatively, the fourth frame can include an indication of a coding scheme that is to be used for each signal transmitted in the fifth frame. As yet another alternative, the fourth frame can include an indication of a coding rate that is to be used for each signal transmitted in the fifth frame. Each step is repeated continuously from the step of receiving the second frame step to the step of receiving the fourth frame when a number of transmitted signals in the frame transmitted from the first station to the second station is one. Otherwise, each step is repeated from transmitting the predetermined number of signals to the step of receiving the fourth frame.

For the second embodiment of the present invention, when the first station is a base station and the second station is a mobile station, the first, third and fifth frames are downlink frames and the second and fourth frames are uplink frames. When the first station is a mobile station and the second station is a base station, the first, third and fifth frames are uplink frames and the second and fourth frames are downlink frames.

A third embodiment of the present invention provides a rate adaptive method of communicating over a wireless communication system that includes a first station having multiple transmit antennas and multiple receive antennas and a second station having multiple transmit antennas and multiple receive antennas. A signal is received at the first station from the second station using all of the receive antennas of the first station for CCI suppression. A best weight for each receive antenna is computed at the first station based on the received signal. A composite signal is generated that is based on a weighted summation of all received signals, such that each respective received signal is received by a receive antenna of the first station. The composite signal is decoded for obtaining a payload sequence, a CRC sequence, and a control sequence contained in the composite signal. An automatic retransmission request instruction is set in a control sequence of a second frame to indicate a third frame should be transmitted from the second station when the decoded CRC sequence matches the CRC sequence computed from the decoded payload sequence. At least one index is set corresponding to each signal sequence for retransmission in the automatic retransmission request instruction in the control sequence of the second frame when the decoded CRC sequence does not match the CRC sequence computed from the decoded payload sequence. It is then determined whether at least one additional signal should be transmitted by the first station in the third frame based on an overall system performance measure. The second frame is transmitted from the first station to the second station. The second frame includes an indication of the determination whether at least one additional signal should be transmitted from the second station in the third frame. According to the invention, the indication transmitted in the second frame is based on an overall system performance measure, such as an overall system throughput, a minimum of a maximum delay for all links in the wireless communication system, a maximum of a minimum data rate for all links in the wireless communication system, an SINR associated with the first frame, and a minimum mean-square error associated with the first frame. A predetermined number of transmitted signals in the third frame is received at the first station using a corresponding predetermined number of the receive antennas of the first station. The predetermined number of signals is based on the indication transmitted in the second frame. A best weight for each receive antenna for the predetermined number of received signals is computed at the first station. A composite signal is generated that is based on a weighted summation of a predetermined number of all received signals. Each respective received signal of the predetermined number of received signals is received from a receive antenna of the first station. The composite signal that is based on the weighted summation of the predetermined number of all received signals is decoded for obtaining a payload sequence, a CRC sequence, and a control sequence contained in the composite signal that is based on the weighted summation of the predetermined number of signals. An automatic retransmission request instruction is set in a control sequence in a fourth frame to indicate a fifth frame should be transmitted when the decoded CRC sequence matches the CRC sequence computed from the decoded payload sequence of the composite signal. At least one index is set corresponding to each signal sequence that should be retransmitted in the automatic retransmission request instruction in the control sequence of the fourth frame when the decoded CRC sequence of the composite signal does not match the CRC sequence computed from the decoded payload sequence contained in the composite signal that is based on the predetermined number of weighted signals. A predetermined number of signals that should be transmitted from the second station in the fifth frame is estimated at the first station. The estimated number of signals to be transmitted in the fifth frame is transmitted from the first station to the second station in a control sequence of the fourth frame. Each step is continuously repeated from the step of receiving a signal at the first station from the second station using all of the receive antennas of the first station for CCI suppression to the step of transmitting the estimated number of signals that are to be transmitted in the fifth frame. Otherwise, each step is continuously repeated from the step of computing at the first station a best weight for each receive antenna for the predetermined number of received signals to the step of transmitting the estimated number of signals that are to be transmitted in the fifth frame.

For the third embodiment of the present invention, when the first station is a base station and the second station is a mobile station, the first, third and fifth frames are downlink frames and the second and fourth frames are uplink frames. When the first station is a mobile station and the second station is a base station, the first, third and fifth frames are uplink frames and the second and fourth frames are downlink frames.

The present invention also provides a station in a multipath wireless communication system that includes at least one link between the station and at least one other station. The station includes multiple receive antennas and multiple transmit antennas. At least one receive antenna receives a signal from at least one other station indicating a predetermined number of independent streams that are to be transmitted over a link between the station and the other station. The number of independent streams is based on an overall system performance measure. At least one transmit antenna transmits the predetermined number of independent signals over the link to the other station. The system performance measure is based on, for example, an overall system throughput, a SINR for at least one link in the communication system, a minimum mean-square error for at least one link in the communication system, a calculated data rate for at least one link in the communication system, a minimum of a maximum delay for at least one link in the communication system, a maximum of a minimum data rate for at least one link of the communication system. Further, at least one receive antenna receives at least one independent stream over a link from the other station, and at least one transmit antenna transmits a signal to the other station indicates a second predetermined number of independent streams that are to be transmitted over the link to the station from the other station. The second number of independent streams that are to be transmitted over the link to the station from the other station is based on the overall system performance measure.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

Figure 1:
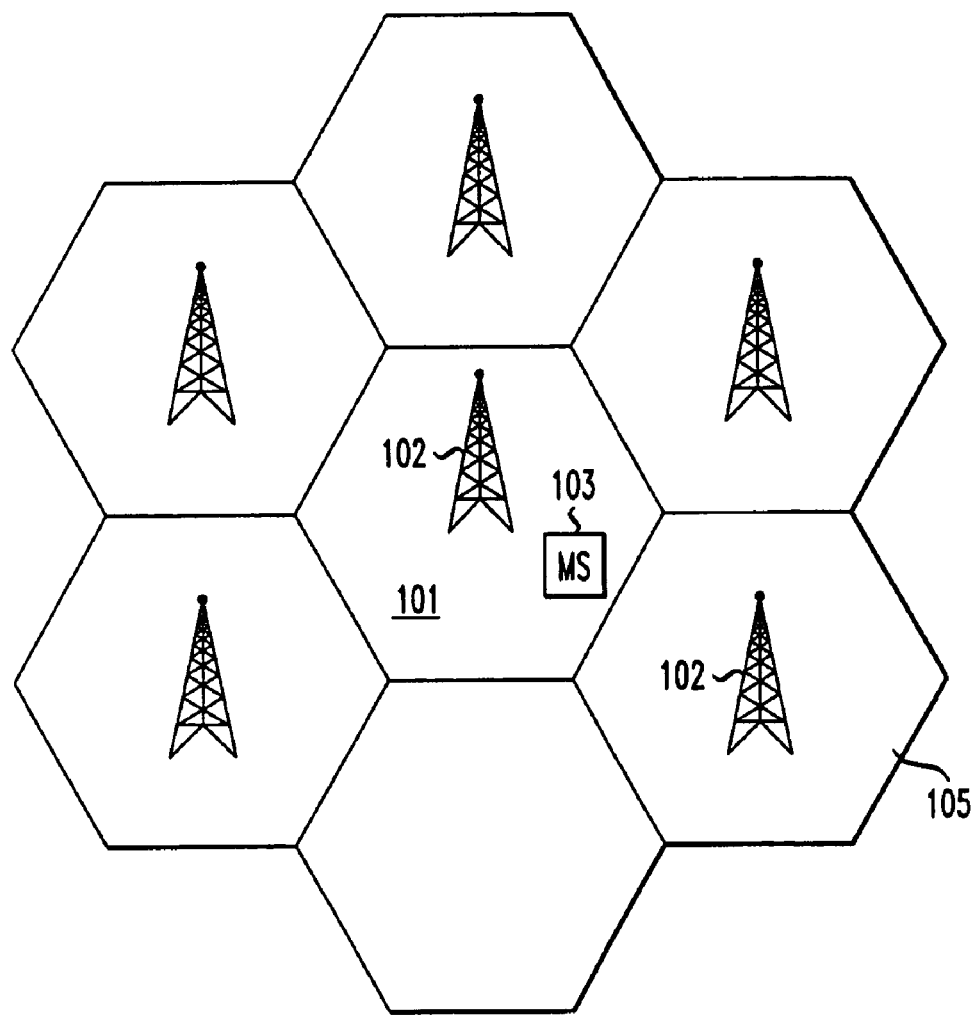
FIG. 1 is an exemplary cellular network that employs a rate-adaptive MIMO communications technique according to the present invention.

The present invention provides a system and method for communicating over a wireless communication system having multiple links in which each link uses multiple transmit and receive antennas. Such a system operates in a multipath environment and, according to the present invention, the data rate is determined by the number of independent streams of data that are transmitted, such that the number of independent streams is based on overall system performance. Overall system performance is measured using any of a number of standard measurements, for example (but not limited to) a mean-square error for each link, overall system throughput, average signal-to-interference-plus-noise ratio (SINR) for each link, a calculated data rate for each link, minimum of a maximum delay, and maximum of a minimum data rate for each link.

A mean-squared error for a link is a mathematical scalar that is calculated in a well-known manner between a known training sequence and the received version of the training sequence (containing noise). For example, consider a training sequence of [1, 2, 3], and a received version of the training sequence of [0.9, 2.1, 2.9]. The mean-squared error between the training sequence and the received version is $(1-0.9)^2+(2-2.1)^2+(3-0.9)^2=0.03$. The present invention provides that different MIMO rates and other communication parameters can be chosen for each link, so the received version performance can vary accordingly. The best rate and other parameters can be determined by choosing the rate and parameters such that the mean-squared error is a minimum.

A calculated data rate for a link as a performance measure, as used herein, is defined as follows. As a data rate over a link increases, the possibility the data may contain errors also increases. In order to achieve the best performance over a link, the data rate should be as high as possible, but the transmission error rate should, at the same time, be within specified acceptable limits. Thus, the phrase "calculated data rate", as used herein, means the selected MIMO rate.

A minimum of a maximum delay for a link performance measure relates to a scheduling algorithm at a base station. Typically, a base station needs to serve many mobile stations, some of which are operating under good receiving conditions while others not. A simple way for optimizing the overall system throughput performance is to not transmit data to mobile stations that are operating under a bad receiving condition. Nevertheless, sometimes it is difficult to avoid transmitting to the mobile stations operating under bad receiving conditions because service requirement dictate that the mobile station be serviced. A variety of other optimization criteria have been proposed, which include transmitting data to a mobile station operating under a bad receiving condition only once a while. From the system point-of-view, the maximum delay for such transmission is minimized; hence, a minimum of a maximum delay performance measure.

A maximum of a minimum data rate for a link is also a performance measure that relates to a scheduling algorithm at a base station. As previously mentioned, one system-wise optimization goal is for maximizing the overall system throughput. Under such a goal, mobile stations operating under bad receiving conditions are best not served and their corresponding data rates are 0. This approach, though, cannot be used in a real system. Thus, the "maximum of a minimum data rate" performance measure is an alternative approach for achieving a maximum overall system throughput. That is, some low data rate is maintained for mobile stations operating under bad receiving conditions. From the system point-of-view, the overall system throughput is still very high. The goal is that such a low data rate should be as high as possible (i.e., maximum of a minimum data rate) without significantly sacrificing system throughput.

Multiple antennas can be used for increasing the data rate and quality by creating parallel spatial channels and enhancing diversity. The multiple antennas installed on a mobile station can be used for two different purposes when the mobile station receives signals from a base station: one purpose is for receiving MIMO signals, and the other purpose is for suppressing CCI (co-channel interference). CCI is caused by signals transmitted by base stations in neighboring cells that re-use the frequencies and time slots of the signals transmitted from the base station to the mobile station in the studied cell.

Using multiple antennas on the mobile station can improve the overall system spectral efficiency (bits per second per Hz). When a base station transmits M different signals (data streams) to a mobile station (or terminal) that is using multiple antennas for receiving the M signals using the same frequency and time slot for each of the M different signals and using a different antenna for transmitting each of the M different signals, the transmission data rate from the base station to the mobile station can be increased M-fold when the MIMO channel fading correlation is very small. Indeed, the capacity of a link is always maximized by transmitting M signals using MIMO. If, however, every base station transmits M signals during any given time slot, the average CCI in the entire cellular network also increases M-fold, which results in a higher Bit Error Rate (BER) and thus lower system throughput/capacity.

When every base station transmits only one signal in one time slot on one carrier, the multiple antennas on the mobile station can be used for suppressing CCI. Each antenna on the mobile station amplifies the received signal with an "optimal" weight, such that the weighted summation of all received signals contains the desired signal (i.e., the signal transmitted from the base station in the studied cell) plus a minimum amount of interfering signals (i.e., signals transmitted from other base stations in neighboring cells that re-use the frequency and time slot). Thus, the average signal-to-interference ratio (SIR) can be significantly increased, which results in much lower BER and thus higher system throughput. With help of strong CCI suppression using multiple antennas, the cellular network can thus adopt an aggressive frequency re-use plan such as 1/1. Consequently, the overall system spectral efficiency is improved.

It is, therefore, necessary to balance the use of the multiple antennas on a mobile station between use of the multiple antennas for suppressing CCI and use of the multiple antennas for receiving multiple signals. By adapting the use of the antennas, the data rate is adaptive (i.e., between 1 and M signals can be transmitted) and the multiple antennas can be used more efficiently. In addition, the method of the present invention can also employ dynamic channel assignment, along with adaptive coding and modulation, to improve overall system performance. Channels are assigned dynamically and different channels can be simultaneously assigned for different users permitting the data rate of the MIMO system to be adapted to the channel characteristics. The channel characteristics are measured, as discussed above.

In an exemplary embodiment of the present invention using four transmit and four receive antennas (M=4), up to four independent data channels (data streams) can be provided in the same bandwidth. Capacity close to four times that of a single antenna is possible using the four transmit antennas and four receive antennas.

On average, it has been shown by simulations that, with M=4 and under normal conditions in cellular networks (before the frequency re-use factor is driven down to 1), the multiple antennas on the mobile station should be used for CCI suppression instead of MIMO signal reception because the spectral efficiency gained by adopting a small frequency re-use factor due to CCI suppression is greater than that gained by the high data rate of MIMO communication.

When every mobile station can dynamically choose to use multiple antennas for CCI suppression, or MIMO reception, or a mixture of both, based on the channel conditions, the overall system throughput can be further improved. That is, when a mobile station detects that the SINR is high (i.e., there is little interference) and the channel fading correlation is small, the mobile station can request the base station to transmit M signals (i.e., M data streams), each using one antenna of the base station, and use all M antennas on the mobile station for MIMO reception. When the mobile station detects that the SINR is low (i.e., there are many interferers) or the channel fading correlation is high, the mobile station can request the base station to transmit one signal (i.e., one data stream) using one antenna or multiple antennas with transmission diversity, and use all antennas on the mobile station for CCI suppression. When the mobile station detects a moderate SINR (with perhaps only one or two interferers) and a moderate channel fading correlation, the mobile station can request the base station to transmit a small number of signals (i.e., data streams) (between 1 and M) using some antennas or all antennas with transmission diversity, and use the antennas on the mobile station for both MIMO signal reception and CCI suppression. Furthermore, if a link strongly interferences with another link, then that the interfering link may reduce the number of MIMO signals to reduce the effect of interference into the other link, thereby increasing overall system throughput. Thus, the ability to adapt the use of the antennas for CCI suppression or for MIMO reception and thus to adapt the data rate of the system is central to the present invention.

The present invention can be implemented using an exemplary system, which is shown in FIG. 1. FIG. 1 shows an exemplary cellular network 100 that employs a rate-adaptive MIMO communications technique according to the present invention. Cellular network 100 includes many cells. In, for example, cell 101, there is a base station 102 and a number of mobile stations, of which only one is shown and is denoted as 103. There are M antennas installed on base station 102 for transmitting and receiving. Similarly, there are M antennas installed on mobile station 103 for transmitting and receiving. The desired signals received by mobile station 103 are the signals transmitted from base station 102. The interfering signals received by mobile station 103 are the signals transmitted from base stations in neighboring cells, such as base station 104 in cell 105.

Figure 2:
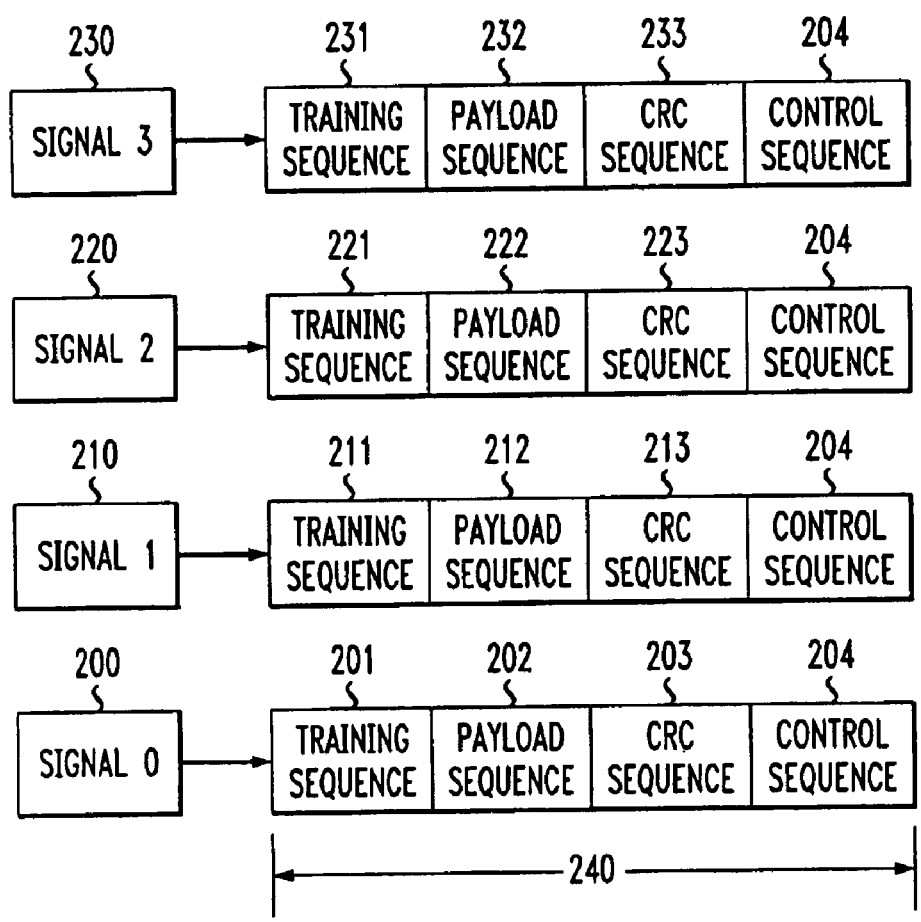
FIG. 2 is an exemplary frame structure for both the uplink and downlink frames that can be used for a rate-adaptive MIMO communications technique according to the present invention.

Each signal transmitted between base station 102 and mobile station 103 adopts an exemplary frame structure, such as shown in FIG. 2 (the frame structure applies to both uplink and downlink frames), in which one time slot 240 of signal 200 contains a training sequence 201, a payload sequence 202, a CRC sequence 203, and a control sequence 204. Training sequence 201 is used for estimating the channel response between base station 102 and mobile station 103. Payload sequence 202 is the transmitted data. CRC sequence 203 is a short sequence generated from payload sequence 202 that can be used to indicate whether payload sequence 202 is correctly detected by mobile station 103. Control sequence 204 contains an automatic retransmission request (ARQ) instruction and a rate-adaptation instruction for future frames that are to be transmitted in the other direction (i.e., if a frame is a downlink frame, the ARQ instruction and the rate-adaptation instruction are applied to future uplink frames, and vice versa). The ARQ instruction only contains either a flag indicating to "transmit a new frame" or the indices of signals that need to be retransmitted (as discussed below).

The rate-adaptation instruction contains the number of signals (data streams) that are to be transmitted, the modulation methods, and the coding type and rate.

In the case that rate-adaptive MIMO communication according to the present invention is enabled between base station 102 and mobile station 103, there are multiple signals (data streams) that are simultaneously transmitted in every time slot 240, which are denoted as 210, 220, 230, etc. Each signal is identified by an index number starting from 0. For example, if base station 102 uses all M antennas for transmitting M different signals (data streams), the respective indices of these signals are 0, 1, 2, . . . , M−1. As shown in FIG. 2, one time slot 240 of each signal includes a training sequence (i.e., 211, 221 and 231), a payload sequence (i.e., 212, 222 and 232), a CRC sequence (i.e., 213, 223 and 233), and a control sequence (i.e., 204). Note that all the different signals (data streams) have the same control sequence 204. Consequently, the BER for the control sequence can be lowered due to the transmission diversity.

There are several methods for adapting the MIMO data rate based on channel conditions. An exemplary method is described below:

(1) At transmission onset, base station 102 preferably transmits only one signal (data stream) in a downlink frame to mobile station 103 using a proper modulation method, such as BPSK or QPSK, and a coding scheme, such as FEC, with a proper coding rate, all of which is predetermined based on the average SINR over the entire system and/or the default system configuration. The single signal can optionally be transmitted using either one antenna or multiple antennas with transmission diversity; and mobile station 103 uses all M antennas for CCI suppression.

(2) After receiving the downlink frame, mobile station 103 computes the best weight for each receive antenna and generates a composite signal that is the weighted summation of the signals received from each antenna, such that the mean-squared error (MSE) of the training sequence 201 is minimized. Signal decoding is accomplished by performing timing recovery and symbol synchronization for recovering a transmitted signal sequence.

(3) Based on the composite signal, mobile station 103 decodes the payload sequence, the CRC sequence, and the control sequence. If the detected CRC sequence matches the CRC sequence computed from the decoded payload sequence, which means the payload sequence has been decoded correctly, the ARQ instruction in the control sequence in the next uplink frame is thus set to indicate "transmit next downlink frame." Otherwise, the ARQ instruction contains the indices of the signals that need to be retransmitted. In this case—in which only one signal (data stream) is being transmitted—the index is 0.

(4) Mobile station 103 then estimates whether one more signal (data stream) should be transmitted from base station 102 in the next downlink frame based on, for example, the estimated SINR and the decoding correctness (based on the matched CRC results) for the signal received in the previous downlink frame. If the signal is decoded correctly and if the estimated SINR is greater than a preset threshold (which guarantees a certain BER on average), at least one more signal (data stream) should be transmitted in the next downlink frame using the same modulation method and coding scheme with the same coding rate. If the signal is not decoded correctly, the signal should be retransmitted in the next downlink frame using a simpler modulation technique, a stronger coding scheme, or a lower coding rate. In another case (i.e., the signal is decoded correctly but the estimated SINR is less than the threshold), one signal should be transmitted in the next downlink frame using the same modulating method and coding scheme with the same coding rate. Additionally or alternatively, the transmission power level can be appropriately adjusted. Mobile station 103 puts the decision (number of transmitted signals, modulation method, coding scheme, and coding rate) as the rate-adaptation instruction in the control sequence of the next uplink frame.

(5) Mobile station 103 sends the ARQ instruction and the rate-adaptation instruction to base station 102 in the control sequence 204 of the next uplink frame.

(6) After receiving the uplink frame, base station 102 arranges the number of signals specified in the uplink control sequence, denoted by N, into a downlink frame (the N signals should contain the retransmitted signal if the signal was not decoded correctly) using the specified modulation and coding methods and sends the signals to mobile station 103 in one time slot simultaneously, each using one of the available transmit antennas.

(7) After receiving the downlink frame, which includes N signals (data streams), mobile station 103 computes the best weight for each receive antenna and generates a composite signal that is the weighted summation of the signals received from each antenna as an estimate of the ith signal, denoted as Si(t), such that the MSE(i) of training sequence 201 for the transmitted signal Si(t) is minimized.

(8) Based on the composite signal for the transmitted signal Si(t), mobile station 103 decodes the payload sequence, the CRC sequence, and the control sequence. If the detected CRC sequence matches the CRC sequence computed from the decoded payload sequence, which means the payload sequence is decoded correctly, the ARQ instruction corresponding to the transmitted signal Si(t) in the control sequence 204 in the next uplink frame is thus set to signal "transmit next downlink frame." Otherwise, the ARQ instruction signals "retransmit Si(t) in the next downlink frame." Mobile station 103 repeats step (7) and (8) for every i=1, 2, . . . , N. After this is done, mobile station 103 can obtain an N×N matrix channel response H(N) for the MIMO channel.

(9) Mobile station 103 then estimates how many signals should be transmitted from base station 102 in the next downlink frame based on the average SINR, the number of correctly decoded signals, and the MIMO channel response matrix H(N). Mobile station 103 first studies the rank of the channel response matrix H(N). The rank tells the maximum number of signals that can be transmitted in the next downlink frame. If this rank is smaller than N, which means the MIMO channel is correlated, the number of transmitted signals in the next downlink frame should be reduced from N to the rank with modulation method, coding scheme, and coding rate unchanged. If the rank is equal to N, different rate-adaptive methods will be adopted in the following different scenarios.

(a) If all signals are decoded correctly and if the average SINR is greater than the threshold and if N<M, then N+1 signals can be transmitted in the next downlink frame using the same modulation method or coding scheme with the same coding rate.

(b) If all signals are decoded correctly and if the average SINR is greater than the threshold and if N=M, then the same number of signals (N) should be transmitted in the next downlink frame using a more complex modulation scheme or a weaker coding scheme or a higher coding rate.

(c) If all signals are decoded correctly, but the average SINR is less than the threshold, or if more than N/2 signals are decoded correctly and the average SINR is greater than the threshold, then the same number of signals (N) should be transmitted in the next downlink frame with the same modulation method and coding scheme with the same coding rate.

(d) In all other scenarios, the same number of signals (N) should be transmitted in the next downlink frame using simpler modulation method or stronger coding scheme or lower coding rate. After all of the above is done, the mobile station puts the number of signals to be transmitted in the next downlink frame, the modulation method, the coding scheme, and the coding rate as the rate-adaptation instruction into the control sequence 204 of the next uplink frame. Accordingly, the rate-adaptation instruction can be a relative-based instruction or an absolute-based instruction.

(10) Mobile station 103 sends the ARQ instruction and the rate-adaptation instruction to base station 102 in control sequence 204 of the next uplink frame.

(11) If the number of transmitted signals in the next time slot is 1, go to step (2); otherwise go to step (6).

The MIMO channel capacity was tested between a laptop having four transmit antennas and a base station having four receive antennas. The tests were conducted on the uplink side rather than on the downlink side as discussed above. Uplinks and downlinks can be considered mirror images of each other.

Figure 3A:
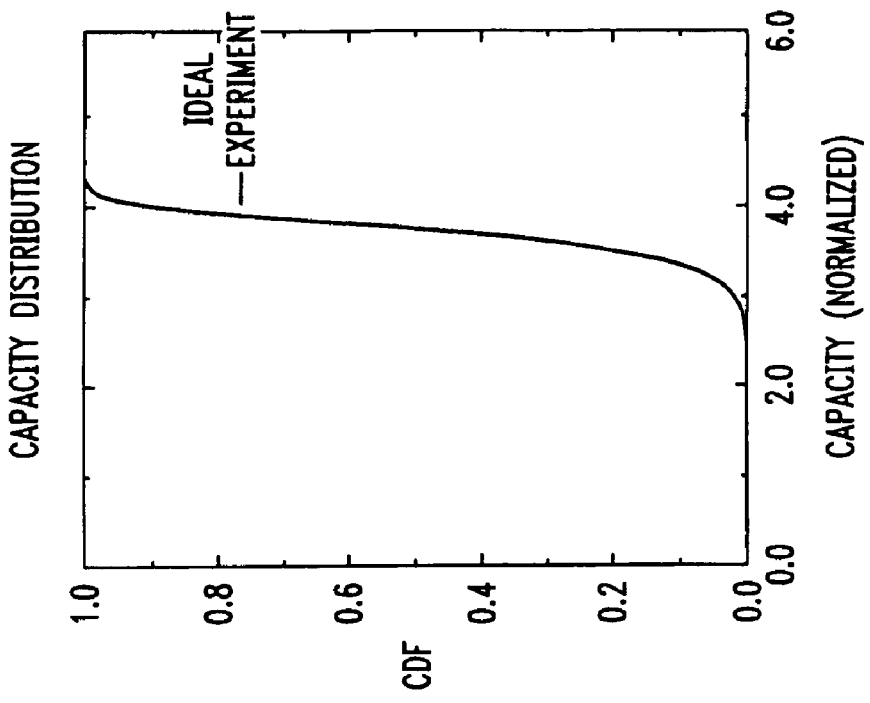
FIG. 3A is a graph showing the normalized potential capacity of a rate-adaptive MIMO system according to the present invention using four transmit antennas and four receive antennas relative to a single antenna system.
Figure 3B:
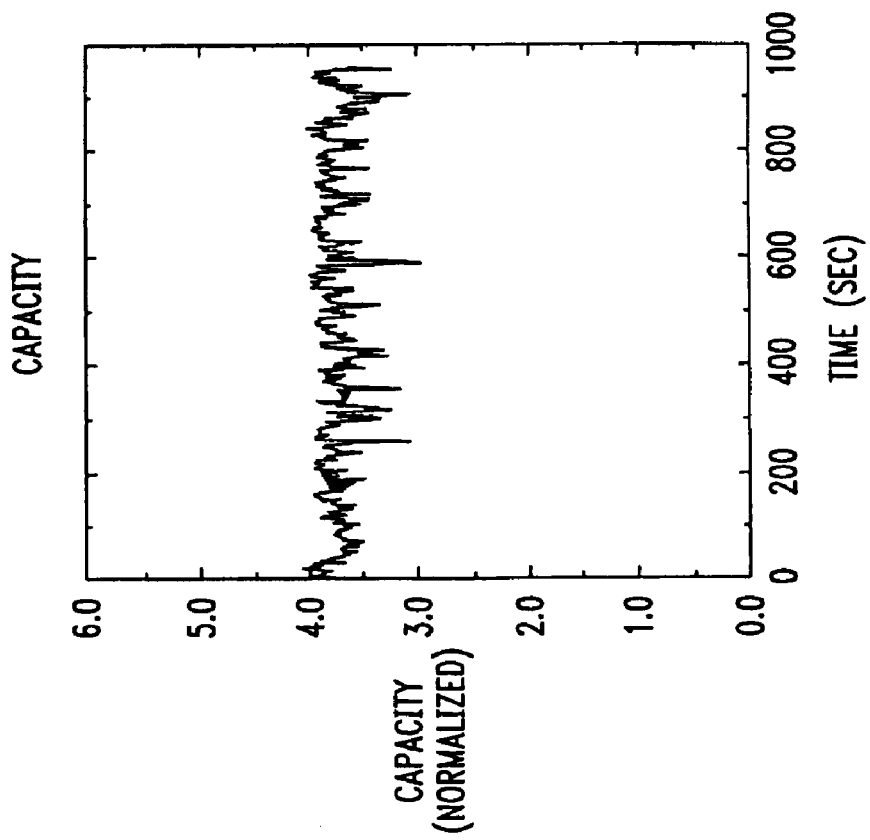
FIG. 3B is a graph showing the capacity distribution function (CDF) of a tested rate-adaptive MIMO system according to the present invention as a function of the normalized capacity.

FIG. 3A is a graph showing the potential capacity of the tested rate-adaptive MIMO system according to the present invention relative to a single antenna system. FIG. 3B is a graph showing the capacity distribution function (CDF) of the tested rate-adaptive MIMO system according to the present invention as a function of the normalized capacity. For FIGS. 3A and 3B, four signals were transmitted from a mobile station and all four of the antennas of the base station were used for MIMO signal reception instead of CCI suppression.

Figure 4:
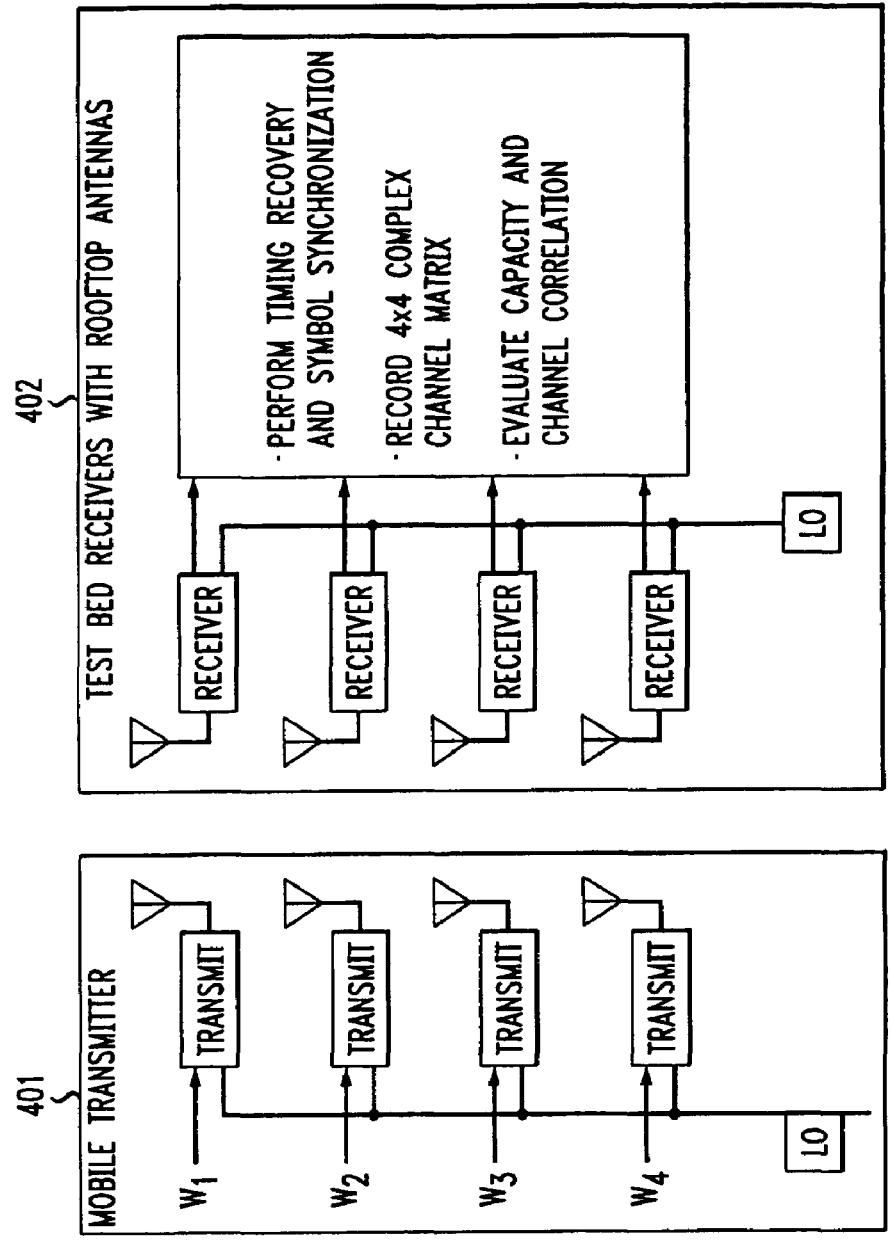
FIG. 4 shows a rate-adaptive MIMO system test bed according to the present invention including a mobile station having four transmit antennas and a base station having four receive antennas.

The rate-adaptive MIMO system of present invention was tested using a wireless terminal along pedestrian routes and driving routes. The wireless terminal used four transmit antennas and the base station used four receive antennas. FIG. 4 depicts an exemplary mobile station 401 having four transmit antennas and an exemplary base station 402 having four receive antennas. FIG. 4 also highlights some of the steps performed by the present invention, as described above. All of the pedestrian and driving routes used in the test were non-line-of-sight with the base station.

Figure 5:
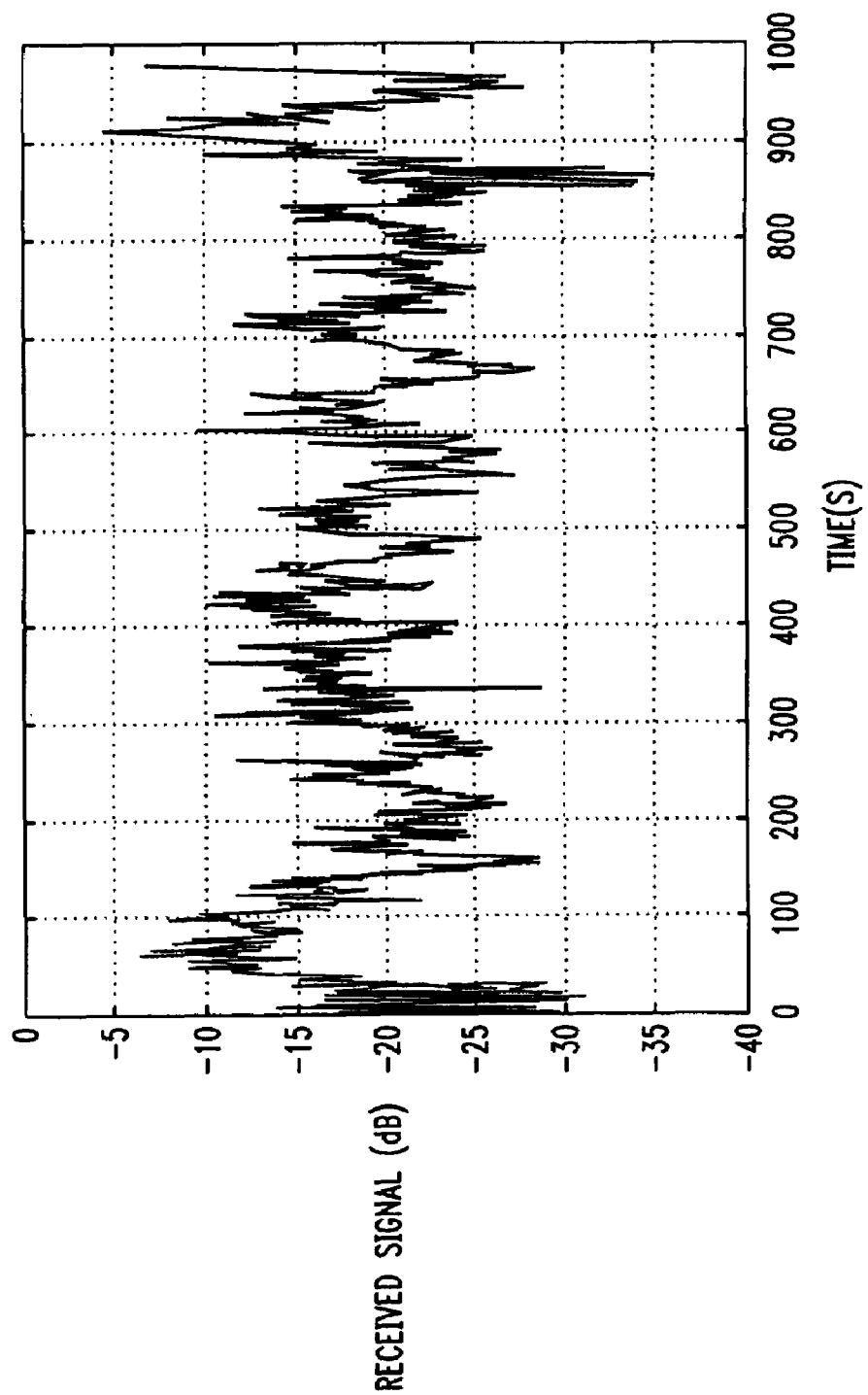
FIG. 5 is a graph of test results showing the amplitudes for the 16 signals (data streams) between the four transmit and four receive antennas with a 1 second average and in which channel powers are approximately equal for dual-polarized transmit and receive antennas.

FIG. 5 is a graph of the test results showing amplitudes as a function of time for the 16 channels (data streams) between the four transmit and four receive antennas with a one second average and in which channel powers are approximately equal for dual-polarized transmit and receive antennas.

Figure 6A:
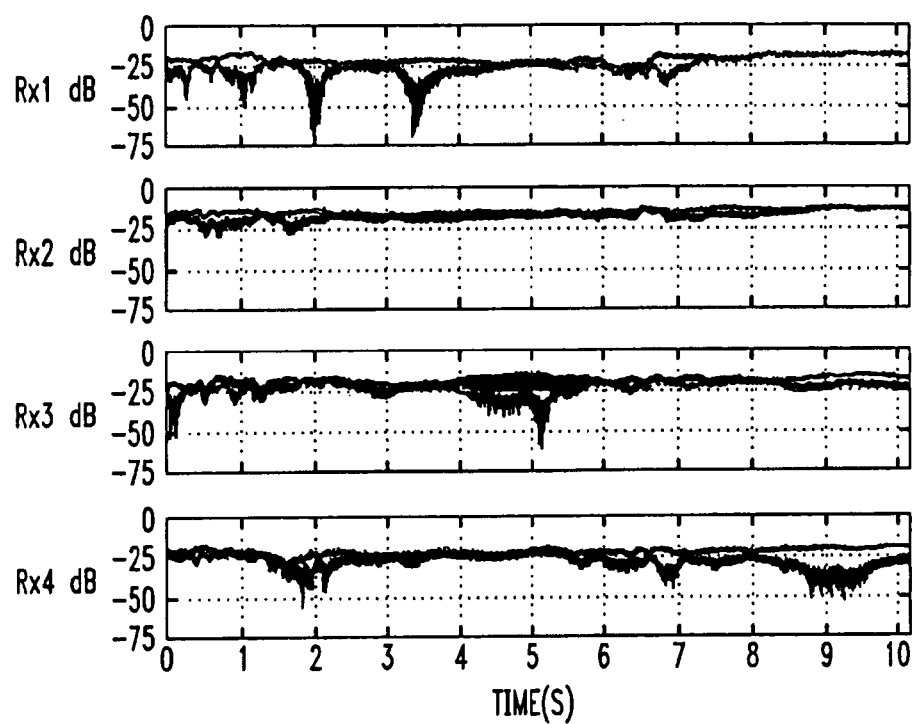
FIG. 6A shows multiple graphs for the test results obtained for pedestrian-based test routes.
Figure 6B:
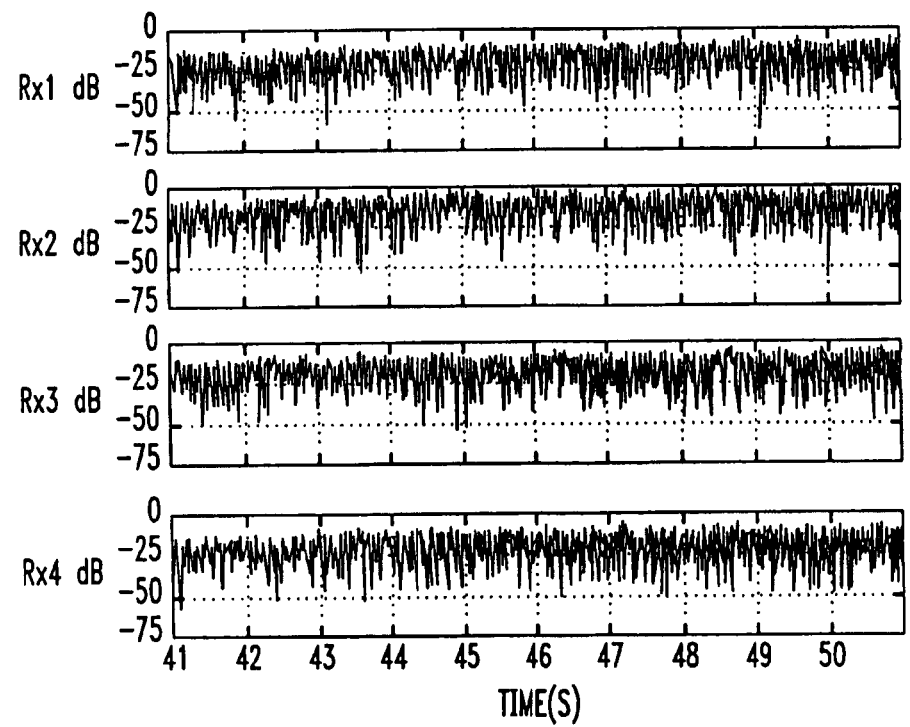
FIG. 6B shows multiple graphs for the test results obtained for the driving-based test routes.

FIG. 6A shows multiple graphs for the test results obtained for pedestrian-based test routes. FIG. 6B shows multiple graphs for the test results obtained for the driving-based test routes. Each respective group of graphs includes four separate graphs. Each graph in a group respectively shows the amplitudes at one receive antenna of the signals transmitted from the four transmit antennas. The amplitudes of the 16 channels shown in each figure are shown with no averaging. As can be seen, the channel characteristics vary for the pedestrian and driving users, but the capacities are similar because spatial-averaging reduces the effects of fading.

Figure 7:
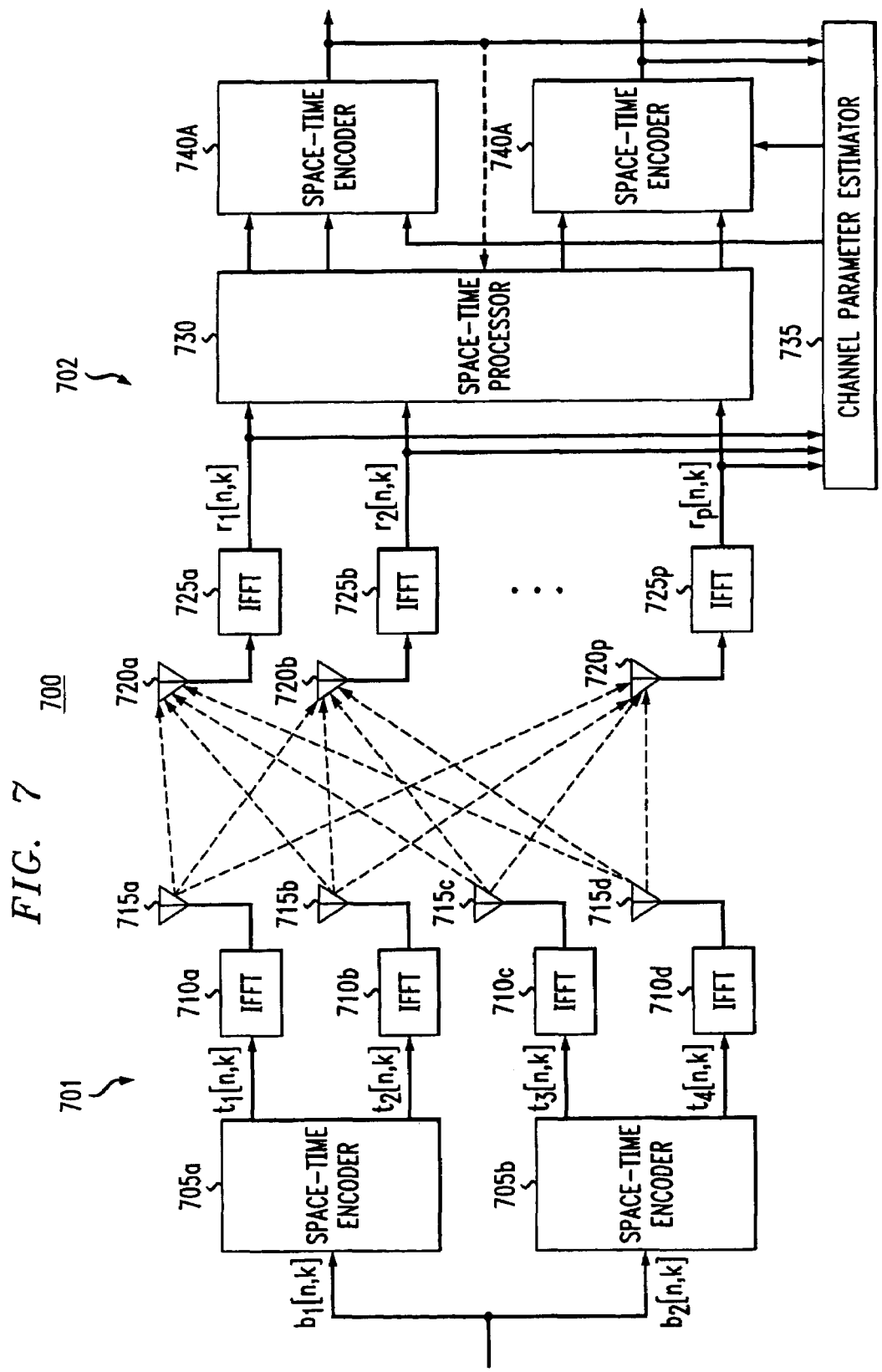
FIG. 7 shows an exemplary rate-adaptive MIMO system architecture according to the present invention.

FIG. 7 shows an exemplary MIMO system architecture 700 according to the present invention that uses space-time coding and OFDM techniques. The left-most portion of FIG. 7 is a transmission portion 701 and can be a base station or a mobile station because, according to the present invention, a base station and a mobile station are essentially mirror images of each other. On the transmit side 702 (the left-most side) of FIG. 7, space-time encoders 705a and 705b encode signals $b_1$, [n,k] and $b_2$[n,k] for forwarding to M inverse fast Fourier transformers (IFFTs) 710a–710d for transmission over M antennas 715a–715d in a multipath environment. On the receive side (the right-most side) of FIG. 7, M antennas 720a–720p detect/receive the M transmitted signals and forward the detected/received signals to fast Fourier transformers (FFT) 725a–725p. The multiple detected/received signals are then forwarded to a space-time processor 730 and to a channel parameter estimator 735. Upon completion of the space-time processing, the processed detected/received signals are space-time decoded by space-time decoders 740a and 740b. The decoded processed detected/received signals are output to a user and further forwarded to the channel parameter estimator 735 and to the space-time processor 730. The space-time decoders are further provided with input from the channel parameter estimator 735. In this OFDM system, the number of MIMO channels, as well as the modulation and coding technique, can be adapted on a frequency tone-by-tone basis to maximize the overall system performance measure.

While particular embodiments of the present invention have been described and illustrated, it should be noted that the invention is not limited thereto since modifications may be made by persons skilled in the art. The present application contemplates any and all modifications that fall within the spirit and scope of the underlying invention disclosed and claimed herein.

What is claimed is:

1. A rate-adaptive method of communicating over a wireless communication system, the wireless communication system including a first station having multiple transmit antennas and multiple receive antennas and a second station having multiple transmit antennas and multiple receive antennas, the method comprising steps of:
    (a) transmitting a signal in a first frame from the first station to the second station using one of a single transmit antenna of the first station and multiple transmit antennas of the first station with transmission diversity;
    (b) receiving a second frame from the second station at the first station, the second frame including an indication that at least one additional signal should be transmitted in the third frame;
    (c) transmitting a predetermined number of signals in the third frame from the first station to the second station when the second frame includes the automatic retransmission request instruction, the predetermined number of signals being transmitted using a corresponding predetermined number of transmit antennas of the first station, the predetermined number of signals being based on the indication received from the second station that at least one additional signal should be transmitted in the third frame;
    (d) receiving a fourth frame from the second station at the first station, the fourth frame including an indication of a number of signals that should be transmitted from the first station to the second station in a fifth frame in a control sequence of the fourth frame; and
    (e) repeating each step continuously from step (b) when a number of transmitted signals in the frame transmitted from the first station to the second station is one; otherwise repeating each step continuously from step (c).

2. The method according to claim 1, wherein the indication received in the second frame is based on an overall system performance measure.

3. The method according to claim 2, wherein the overall system performance measure is based on an overall system throughput.

4. The method according to claim 2, wherein the overall system performance measure is based on a minimum of a maximum delay for all links in the wireless communication system.

5. The method according to claim 2, wherein the overall system performance measure is based on a maximum of a minimum data rate for all links in the wireless communication system.

6. The method according to claim 2, wherein the overall system performance measure is based on an SINR associated with the first frame.

7. The method according to claim 2, wherein the overall system performance measure is based on a minimum mean-square error associated with the first frame.

8. The method according to claim 1, wherein the fourth frame further includes an indication of a modulation method that is to be used for each signal transmitted in the fifth frame.

9. The method according to claim 1, wherein the fourth frame further includes an indication of a coding scheme that is to be used for each signal transmitted in the fifth frame.

10. The method according to claim 1, wherein the fourth frame further includes an indication of a coding rate that is to be used for each signal transmitted in the fifth frame.

11. The method according to claim 1, wherein the first station is a base station, the second station is a mobile station, the first, third and fifth frames are downlink frames, and the second and fourth frames are uplink frames.

12. The method according to claim 1, wherein the first station is a mobile station, the second station is a base station, the first, third and fifth frames are uplink frames, and the second and fourth frames are downlink frames.

13. A rate adaptive method of communicating over a wireless communication system, the wireless communication system including a first station having multiple transmit antennas and multiple receive antennas and a second station having multiple transmit antennas and multiple receive antennas, the method comprising steps of:
  (a) receiving a signal at the first station from the second station using all of the receive antennas of the first station for CCI suppression;
  (b) computing at the first station a best weight for each receive antenna based on the received signal;
  (c) generating a composite signal that is based on a weighted summation of all received signals, each respective received signal being received by a receive antenna of the first station;
  (d) decoding the composite signal for obtaining a payload sequence, a CRC sequence, and a control sequence contained in the composite signal;
  (e) setting an automatic retransmission request instruction in a control sequence of a second frame to indicate a third frame should be transmitted from the second station when the decoded CRC sequence matches the CRC sequence computed from the decoded payload sequence;
  (f) setting at least one index corresponding to each signal sequence for retransmission in the automatic retransmission request instruction in the control sequence of the second frame when the decoded CRC sequence does not match the CRC sequence computed from the decoded payload sequence;
  (g) determining whether at least one additional signal should be transmitted by the first station in the third frame based on an overall system performance measure;
  (h) transmitting the second frame from the first station to the second station, the second frame including an indication of the determination whether at least one additional signal should be transmitted from the second station in the third frame;
  (i) receiving at the first station a predetermined number of transmitted signals in the third frame using a corresponding predetermined number of the receive antennas of the first station, the predetermined number of signals being based on the indication transmitted in the second frame;
  (j) computing at the first station a best weight for each receive antenna for the predetermined number of received signals;
  (k) generating a composite signal that is based on a weighted summation of a predetermined number of all received signals, each respective received signal of the predetermined number of received signals being received from a receive antenna of the first station;
  (l) decoding the composite signal that is based on the weighted summation of the predetermined number of all received signals for obtaining a payload sequence, a CRC sequence, and a control sequence contained in the composite signal that is based on the weighted summation of the predetermined number of signals;
  (m) setting an automatic retransmission request instruction in a control sequence in a fourth frame to indicate a fifth frame should be transmitted when the decoded sequence matches the CRC sequence computed from the decoded payload sequence of the composite signal;
  (o) setting at least one index corresponding to each signal sequence that should be retransmitted in the automatic retransmission request instruction in the control sequence of the fourth frame when the decoded CRC sequence of the composite signal does not match the CRC sequence computed from the decoded payload sequence contained in the composite signal that is based on the predetermined number of weighted signals;
  (p) estimating at the first station a predetermined number of signals that should be transmitted from the second station in the fifth frame;
  (q) transmitting from the first station to the second station the estimated number of signals to be transmitted in the fifth frame in a control sequence of the fourth frame; and
  (s) repeating each step continuously from step (a) when a number of transmitted signals in the frame transmitted from the first station to the second station is one; otherwise repeating each step continuously from step (i).

14. The method according to claim 13, wherein the indication transmitted in the second frame is based on an overall system performance measure.

15. The method according to claim 14, wherein the overall system performance measure is based on an overall system throughput.

16. The method according to claim 14, wherein the overall system performance measure is based on a minimum of a maximum delay for all links in the wireless communication system.

17. The method according to claim 14, wherein the overall system performance measure is based on a maximum of a minimum data rate for all links in the wireless communication system.

18. The method according to claim 14, wherein the overall system performance measure is based on an SINR associated with the first frame.

19. The method according to claim 14, wherein the overall system performance measure is based on a minimum mean-square error associated with the first frame.

20. The method according to claim 13, wherein the first station is a base station, the second station is a mobile station, the first, third and fifth frames are downlink frames, and the second and fourth frames are uplink frames.

21. The method according to claim 13, wherein the first station is a mobile station, the second station is a base station, the first, third and fifth frames are uplink frames, and the second and fourth frames are downlink frames.

* * * * *